P. L. ETCHISON.
GEAR SHIFT MECHANISM FOR MOWING MACHINES.
APPLICATION FILED SEPT. 12, 1917.

1,352,800.

Patented Sept. 14, 1920.

Inventor
P. L. Etchison

# UNITED STATES PATENT OFFICE.

PAUL L. ETCHISON, OF MUSELLA, GEORGIA.

GEAR-SHIFT MECHANISM FOR MOWING-MACHINES.

1,352,800.
Specification of Letters Patent.
Patented Sept. 14, 1920.

Application filed September 12, 1917. Serial No. 190,994.

*To all whom it may concern:*

Be it known that I, PAUL L. ETCHISON, a citizen of the United States, residing at Musella, in the county of Crawford and State of Georgia, have invented certain new and useful Improvements in Gear-Shift Mechanism for Mowing-Machines; and I do hereby declare the following to be a full, clear, and exact description of the invention, such as will enable others skilled in the art to which it appertains to make and use the same.

This invention relates to mowing machines, and the primary object of the invention is to provide a gearing, whereby the speed of the reciprocation of the sickle may be altered as required by different stands of hay or forage being cut by the mowing machine.

More specifically, the object of the invention is to provide a gearing for mowing machines which provide two speeds for the reciprocation of the sickle so that when the mower is used in heavy hay, the sickle bar may be reciprocated at a greater rate of speed than it would be reciprocated when used for cutting a light or medium stand of hay or grass.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1:
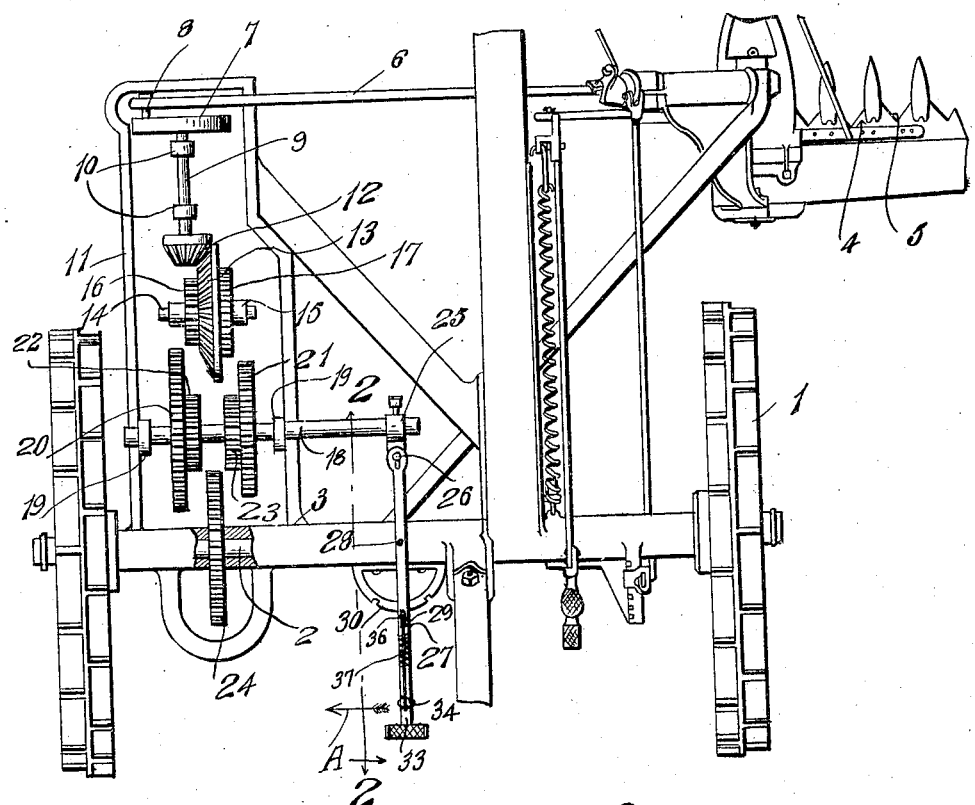
Figure 2:
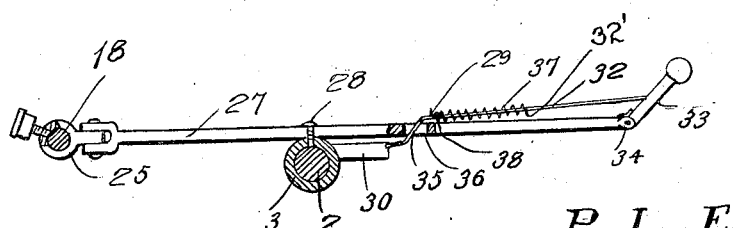

Figure 1 is a plan view of a fragment of a mowing machine showing the improved gearing applied thereto, and Fig. 2 is a fragmentary section taken on the line 2—2 of Fig. 1.

Referring more particularly to the drawings, 1 indicates the supporting wheels of the mowing machine which are mounted upon the usual axle 2. The axle 2 is inclosed by the usual casing 3. The cutter bar structure 4 is of the ordinary construction embodying a reciprocatory sickle 5 which is operated by a pitman 6 through the medium of the rotation of the disk 7 to which the pitman 6 is eccentrically connected, as shown at 8.

The disk 7 is mounted upon the forward end of a shaft 9, which shaft is supported by suitable bearings 10. The bearings 10 are in turn supported by the gear casing 11. A beveled pinion 12 is mounted upon the rear end of the shaft 9 and it meshes with the bevel gear 13. The bevel gear 13 is mounted upon a shaft 14 which is supported by suitable bearings 15, mounted in brackets (not shown) secured to the gear casing 11. Gears 16 and 17 are mounted upon the shaft 14. A shaft 18 is slidably supported by suitable bearings 19 and it has a large gear 20, mounted thereon, a gear 21 which is slightly smaller than the gear 20 and a pair of gears 22 and 23 which are of equal diameter. A main drive gear 24 is mounted upon the axle 2. A knuckle 25 is carried by the end of the shaft 18 and it is pivotally connected as shown at 26 to a foot lever 27. The foot lever 27 is pivotally connected as shown at 28 to the axle casing 3 and it has a dog mechanism 29 carried thereby which coacts with the quadrant 30. The quadrant 30 is attached to the axle casing 3.

The dog mechanism which is generically indicated by the numeral 29 comprises a rod 32 which has one end connected to a foot trip 33. The foot trip 33 is pivotally connected as shown at 34 to the free end of the lever 27. The rod 32 is bent downwardly and outwardly as shown at 35 and extends through the slot 36 formed in the lever 27, having its lower forward end adapted for seating in any one of the notches of the quadrant 30 for holding the lever 27 in adjusted position. A coil spring 37 is coiled about the rod 32 and it has one end attached to the lever 27, as shown at 38, while the other end is attached to the rod 32, as at 32', and this spring tends to hold the lower forward end of the rod 32 in the notches of the quadrant 30.

When it is desired to shift the lever 27, the foot trip 33 is pressed downwardly, which will move the rod 32 rearwardly, moving its lower forward end out of the notches of the quadrant and the foot of the rider is then moved laterally, which will swing the lever upon its pivot 28.

When the mowing machine is used in cutting heavy grass or hay and it is desired to reciprocate the sickle 5 at high speed, the lever 27 is moved in the direction indicated by the arrow A in Fig. 1 of the drawings and this movement will shift the shaft 18 and move the gear 22 into meshing engagement with the gear 24. When the gear 22 is moved into meshing engagement with the gear 24, the gear 20 will mesh with the gear 16 and the shaft 14 will be rotated by the rotation of the axle 2 through the gears 24, 22, 20 and 16, which will rotate the shaft 9 at a high speed and consequently reciprocate the sickle 5 at a high speed through the medium of the pitman rod 6 and the pitman disk 7.

When the machine is cutting light hay or grass, the lever 27 is shifted in the opposite direction to that indicated by the letter A and this will move the gear 23 into mesh with the gear 24 and the gear 21 into mesh with the gear 17, consequently rotating the shaft 14 by the rotation of the axle 2 through the medium of the gears 24, 23, 21 and 17 and rotate the shaft at a lower rate of speed than it would be rotated by the gears 16, 20, 22 and 24, since the diameters of the gears are arranged for this function. The collar or knuckle 25 is rotatably mounted upon the shaft 18 so as to allow the shaft to rotate independently of any rotation of the knuckle.

In reducing the invention to practice, certain minor features of construction, combination and arrangement of parts may necessitate alterations to which the patentee is entitled, provided such alterations are comprehended within the scope of what is claimed.

What is claimed is:—

1. A gear shift comprising an axle, a gear wheel mounted on said axle for rotation therewith, a pair of shafts spaced in parallel relation with respect to one another and with respect to said axle, a driving gear mounted on one of said shafts, gears of different diameters mounted on said shaft to either side of said driving gear, the second shaft between the first mentioned shaft and the axle being slidably mounted for longitudinal movement, pairs of shift gears mounted in spaced relation upon said second shaft, means for sliding said second shaft to bring one of the shift gears of either pair into operative engagement with the gear on said axle and the other gear of said pair into operative engagement with one of the gears on the first mentioned shaft, and means for locking said second shaft in adjusted position.

2. A gear shift comprising an axle, a gear mounted on said axle, a shaft parallel with said axle and carrying a driving gear and gears of different diameters to either side of said driving gear, an intermediate shaft positioned between said first mentioned shaft and said axle and parallel therewith, spaced pairs of shift gears carried upon said intermediate shaft, a lever connected with said intermediate shaft for moving the latter longitudinally to bring one of said shift gears of one of said pairs into operative connection with the gear on said axle and the other gear of said pair into operative connection with one of the gears on the first mentioned shaft, a pivoted foot operated member carried by said lever, and means connected with said pivoted foot operated member for normally locking said lever against movement, said foot operated member being normally held in one position by the last mentioned means and serving as the member by which the lever may be released and moved in either direction when released.

In testimony whereof I affix my signature in presence of two witnesses.

PAUL L. ETCHISON.

Witnesses:
 E. S. WINN,
 W. G. ETCHISON.